United States Patent [19]
Dalia, Jr.

[11] 3,863,724
[45] Feb. 4, 1975

[54] INVENTORY CONTROL SYSTEM

[76] Inventor: Nichola Dalia, Jr., 803 Smith St., Linden, N.J. 07036

[22] Filed: Sept. 20, 1973

[21] Appl. No.: 398,964

[52] U.S. Cl. ........................ 177/25, 177/1, 222/77
[51] Int. Cl. ............................................. G01g 3/14
[58] Field of Search ........................... 177/1–3, 5, 177/15, 25, 211, 245; 73/141; 222/36, 77

[56] References Cited
UNITED STATES PATENTS

| | | | |
|---|---|---|---|
| 2,936,163 | 5/1960 | Foster | 177/181 |
| 3,073,400 | 1/1963 | Bauder et al. | 177/25 |
| 3,137,356 | 6/1964 | Shields et al. | 177/25 |
| 3,177,957 | 4/1965 | Adler et al. | 177/25 |
| 3,257,033 | 6/1966 | Stoff | 222/36 |
| 3,291,232 | 12/1966 | Bell | 177/3 |
| 3,442,453 | 5/1969 | Whitehouse | 177/3 |
| 3,447,720 | 6/1969 | Janigan et al. | 222/36 |
| 3,459,271 | 8/1969 | Susor et al. | 177/3 |
| 3,529,139 | 9/1970 | Godwin | 235/151.33 |
| 3,575,248 | 4/1971 | Bell | 177/211 |
| 3,608,655 | 9/1971 | Ray | 177/1 |
| 3,698,495 | 10/1972 | Vogt | 177/211 |

Primary Examiner—Richard B. Wilkinson
Assistant Examiner—Vit. W. Miska
Attorney, Agent, or Firm—Lerner, David, Littenberg & Samuel

[57] ABSTRACT

A method is provided for determining the amount of alcoholic beverage, or other liquids or solids, dispensed, from a container, during a specific time interval which method includes the steps of sensing a first weight of said container including the contents thereof at a first given time, converting said first sensed weight into a corresponding first electrical signal, sensing a second weight of said container including the contents thereof at a second given time, converting said second sensed weight into a corresponding second electrical signal, comparing said first and second electrical signals, converting said first and second signals into a differential signal and converting said differential signal into a useful format indicating the comparative first and second weights of said container and the contents thereof.

An apparatus is also provided for carrying out the above method, which apparatus includes container support means, weight sensing means responsive to the weight of said container and the material in said container, transducer means for converting weight sensed by said weight sensing means during first and second points in time into at least first and second electrical signals, and conversion means such as a central computer facility, for converting said electrical signals into a useful format relating to the weight of material in said container during said first and second points in time.

12 Claims, 8 Drawing Figures

PATENTED FEB 4 1975  3,863,724
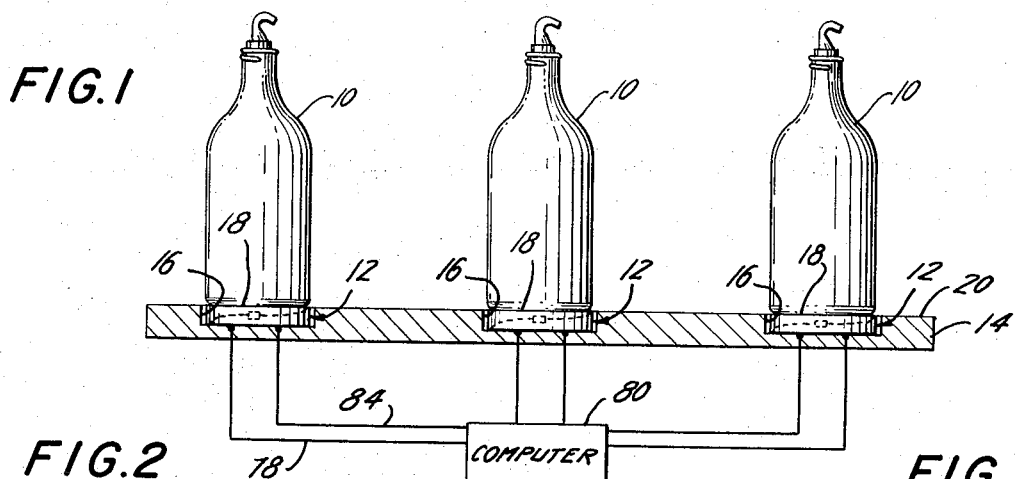
FIG.1
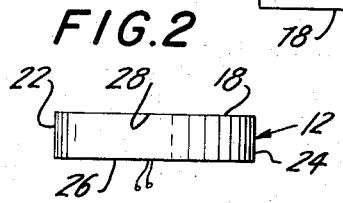
FIG.2
FIG.3
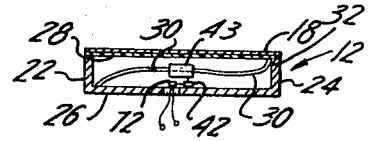
FIG.4
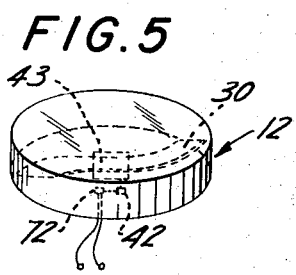
FIG.5
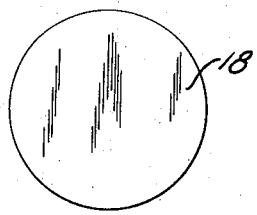
FIG.6
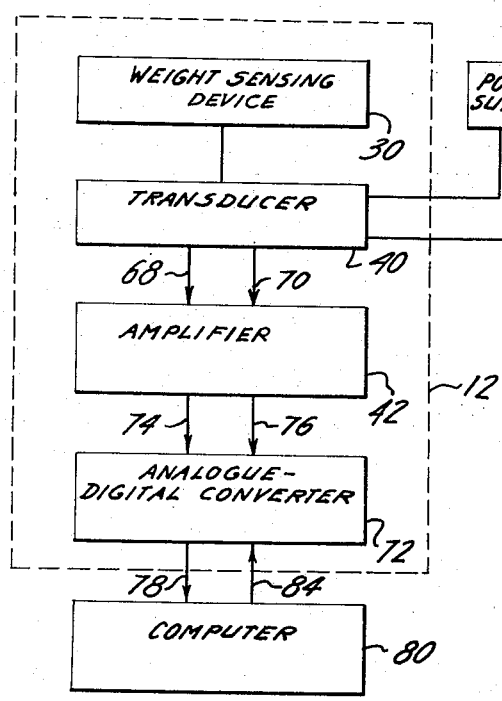
FIG.7
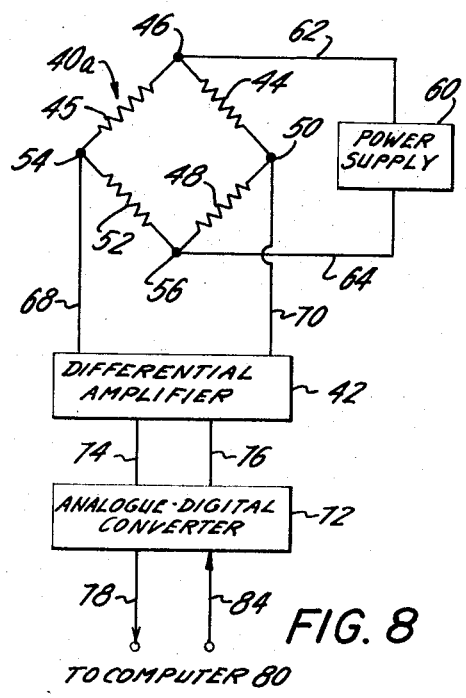
FIG.8

INVENTORY CONTROL SYSTEM

FIELD OF THE INVENTION

The present invention relates to a method and system for determining and accounting for the amount of material dispensed from a container, such as the amount of alcoholic beverage dispensed from a bottle thereof, at a restaurant or barroom, and to apparatus for carrying out such method or employed in such system.

BACKGROUND OF THE INVENTION

The sale of alcoholic beverages over bars at restaurants, barrooms and/or taverns is an ever growing business resulting in hundreds of millions of dollars in revenues annually. The alcoholic beverages are usually contained in bottles which are displayed in back of a bar and are normally dispensed directly from the bottles, by the ounce, with the price per ounce thereof varying depending upon the type and brand of alcoholic beverage dispensed. Revenues, in the form of cash receipts, for such alcoholic beverages are usually received by the bartender directly from the customer or waiter or waitress.

In an ordinary business day, the typical restaurant or tavern employs two to six or more bartenders who dispense hundreds of individual drinks of alcoholic beverages and received hundreds of dollars in revenues for such drinks. All too frequently, proprietors of such establishments find shortages in their inventories of alcoholic beverages displayed at their bars, vis-a-vis the amounts of cash receipts for drinks taken in during a given period of time.

Business in such establishments ordinarily continues without interruption throughout a normal business day and even during changes in shifts of bartenders. Furthermore, during the busy peak hours of the business day, it is common practice for such establishments to have more than one bartender working at the same time. These occurrences make it virtually impossible to determine which bartenders are responsible for shortages in inventory or cash receipts at the end of the working day. Accordingly, the bartenders or other employee personnel responsible for such shortages often go undetected until they only after the proprietor is unlawfully deprived of large sums of money or inventory. Such losses to proprietors are estimated to be in the multi-millions of dollars each year.

Efforts have been made to combat such losses and to detect dishonest bartenders at their handiwork. For example, closed-circuit television systems have been employed to observe bartenders, cashiers and other bar personnel. These television systems have enjoyed some success. However, they have proved to be quite expensive because of the complicated equipment employed which requires frequent and costly maintainence. In addition, such a system requires that trusted personnel continuously control television cameras and monitor centrally located television receivers for each television camera employed. This is expensive and removes employee personnel from other important services.

Another system employed for accounting for inventory of bottles of alcoholic beverages displayed or exposed at resaurants, bars or taverns is the use of a flow meter in conjunction with each bottle. The meter is normally secured over the mouth of the bottle. When liquor or other alcoholic beverage is to be dispensed, the beverage flows through the meter and the amount of beverage dispensed for that particular bottle is recorded by said meter. In some cases, the meter is adjusted to allow delivery of a specified amount of beverage, usually one unit or ounce thereof. The number of units dispensed may also be recorded by such meter.

The use of such meters is becoming increasingly popular, because of the proprietor's concern for shortages and concomitant loss in revenue. However, increase in use primarily can be attributed to the unavailability of a better system. Use of such meters are only a stop-gap measure and are essentially a primative technique for dealing with a modern problem which is increasing in ever abounding proportions. The meters do convey to the proprietor the amount of alcoholic beverage dispensed during a given period of time assuming that an initial reading is recorded. However, the final reading of the meters are usually made at the end of the business day and not after each bartender finishes working. Thus, it is virtually impossible to determine which of the many bartenders dispensing drinks during the business day is responsible for shortages in cash receipts and/or beverage dispensed. In addition, each meter on each bottle must be read and recorded. This is a time consuming operation and rather tedious chore especially at the end of a business day.

U.S. Pat. No. 2,936,163 to Foster discloses a bar accessory which is said to indicate the amount of beverages that have been dispensed or sold to customers by a bartender so that the proprietor can have an accurate indication of the exact amount of beverage dispensed. The Foster bar accessory comprises a shelf for bottles of alcoholic beverages, which shelf includes a conventional weight scale for determining the total amount of alcoholic beverage dispensed from all of the bottles supported on said shelf.

The Foster device is designed to be used in place of existing shelf systems for supporting bottles of alcoholic beverages. Accordingly, it will be apparent that the Foster device could prove to be quite expensive inasmuch as use of the Foster system will require major remodeling of or changes in existing shelf systems before it can be installed.

In accordance with the present invention, there is provided a method, apparatus and system for determining the amount of alcoholic beverage or other liquids or solids, dispensed at a restaurant, tavern or barroom which overcomes the disadvantages associated with prior art systems for accomplishing the same result. The apparatus and system of the invention is of relatively simple, but most efficient, construction and can be installed in and employed with substantially any existing shelf or support system without requiring major remodeling of such existing shelf system.

SUMMARY OF THE INVENTION

The apparatus in accordance with the invention for determining the amount of material dispensed from a container, such as the amount of alcoholic beverage dispensed from a bottle, comprises, in combination, container support means for supporting at least one container of material to be dispensed; weight sensing means responsive to the weight of said container and the material in said container during at least first and second points in time; transducer means for converting weight sensed by said weight sensing means during said first and second points in time into at least first and second electrical signals, such as voltage or current, or other signals, which correspond to the weight of said container and the material in said container during said first and second points in time; and conversion means for converting said electrical signals into a useful format relating to the weight of material in said container during said first and second points in time and operating on said converted signals to determine the amount of material dispensed from said container between said first and second points in time.

In a preferred embodiment of the apparatus of the invention, the weight sensing means is in operative communication with the container support means and the transducer means is in operative communication with the weight sensing means. In addition, the conversion means, which may preferably take the form of a conventional computer device, is in operative communication with the transducer means.

The conversion means further includes request signal means for supplying at least first and second request signals to said transducer means to activate said transducer means to transmit said first and second electrical signals, respectively, to said conversion means, signal receiving and storing means for receiving and storing said first and second electrical signals, signal comparison means for comparing siad first and second electrical signals, and differential signal means for providing a differential signal corresponding to said first and second signals and to the comparative weight of the material in said container during said first and second points in time.

The apparatus of the invention will also preferably include amplifying means for amplifying the aforesaid electrical signals prior to feeding said signals to the conversion means. The amplifying means will be in operative communication with the transducer means.

In order to convert the amplified electrical signal from said amplifying means into a form which can be fed to conversion means, such as a computer, analogue-digital converter means is employed in operative communication with said amplifying means to convert the amplified signal into a digital signal.

In one embodiment of the apparatus of the invention, the container support means comprises a housing which includes a substantially flat upper surface upon which a container such as a bottle, may be supported. The weight sensing means, which preferably takes the form of a deflecting member as will be described in detail hereinafter, is disposed in the housing with a portion of said deflecting member being contiguous to, but electrically insulated from, at least a portion of the upper support surface of said housing. Transducer means are also disposed within the housing, in contact with said deflecting member. The transducer means may in one embodiment of the invention take the form of a strain gauge of conventional design. An example of such a strain gauge suitable for use herein is a wheatsone bridge or strain gauge resistor bridge which is connected to a regulated power supply disposed externally to the housing. The strain gauge resistor bridge will preferably include at least three precision resistors of conventional design, one of said precision resistors being referred to hereinafter as the linking precision resistor, and is connected to the other two precision resistors referred to as the first and second resistors A strain gauge resistor is connected to each of said first and second resistors to form a resistor bridge.

The regulated power supply is connected across the juncture between the strain gauge resistor and first resistor (referred to as the first juncture) and the juncture between the linking precision resistor and the second resistor (referred to as the fourth juncture). The amplifying means, which preferably comprises a differential amplifier of conventional design, is connected across the juncture between the first resistor and the linking precision resistor (referred to as the second juncture) and the juncture between the strain gauge resistor and the second resistor (referred to as the third juncture).

In operation, the strain gauge resistor bridge is initially nulled and all of the resistors of said bridge are in balance. A container such as a bottle of alcoholic beverage is placed on the upper support surface of said housing thereby causing a force to be exerted on the transducer means (deflecting member), which in turn transmits a first electrical signal, such as a first voltage, to the computer where it is stored. The first voltage will correspond to initial weight of the bottle and its contents and is fed to the amplifying means,; the resulting amplified voltage is fed to the analogue-digital converter means where it is converted to a digital signal. Thereafter, a bottle of alcoholic beverage, is removed from the upper support surface of said housing and a drink or unit is dispensed therefrom. The container less one drink, is then placed back of the upper support surface of the housing. The decrease in the weight of the bottle and its contents will cause a change (decrease) in weight or force on the upper support surface of the housing, which change in force will result in a change in force (for example a stress or strain) on the deflecting member. The change in force on the deflecting member will cause a change in the strain gauge resistance of the strain gauge resistor and thereby provide a change in voltage across the first and fourth junctures of the precision resistors and the strain gauge resistor.

The above (second) voltage in differential form is then transmitted to the amplifying means for amplification and the amplified voltage is subsequently fed to the analogue-digital converter means mentioned above, where it is converted to a digital signal. The digital signal is then fed to computer means wherein it is converted to weight of alcoholic beverage dispensed and-/or other information as will be described later. It will be apparent that each time a unit of alcoholic beverage is dispensed from a bottle supported by the upper surface of said housing of said support means, a corresponding differential voltage is generated which will be amplified and converted to a digital signal which will then be fed to a computer. The operation of the computer will be discussed in detail hereinafter.

Further in accordance with the present invention, there is also provided a system for determining the amount of alcoholic beverage dispensed from a plurality of individual bottles of alcoholic beverage, which system comprises, in combination, a plurality of bottle support means each of said support means being adapted to support a bottle of alcoholic beverage; weight sensing means, in operative communication with each of said support means, responsive to the weight of alcoholic beverage in each of said bottles of alcoholic beverage supported by its respective support means during at least first and second points in time; transducer means, in operative communication with each of said weight sensing means, for converting weight of alcoholic beverage sensed by its respective weight sensing means during said first and second points in time, into at least first and second electrical signals which correspond to the weight of said bottle and alcoholic beverage therein during said first and second points in time; and conversion means in operative communication with each of said transducer means, for receiving said electrical signals and converting said electrical signals into a useful format and operating on said converted signals to determine the amount of said alcoholic beverage dispensed from its respective bottle between said first and second points in time.

In addition, the above system will preferably include amplifying means for amplifying said electrical signals and means for converting said amplified signals into digital signals which are transmitted to said conversion means, such as a computer.

In addition, in accordance with the present invention, there is provided a method for determining the amount of material dispensed, during a specific time interval, from a container of such material, which method comprises sensing a first weight of said container including the contents thereof at a first given time, converting said first sensed weight into a corresponding first electrical signal, sensing a second weight of said container including the contents thereof at a second given time, converting said second sensed weight into a corresponding second electrical signal, comparing said first and second electrical signals, converting said first and second signals into a differential signal and converting said differential signal into a useful format indicating the comparative first and second weights of said container and the contents thereof.

The method as set out above further includes the steps of amplifying said electrical signal and converting the amplified signal into a corresponding digital signal prior to converting the amplified signal into a useful format.

BRIEF DESCRIPTION OF THE FIGURES

FIG. 1 is a schematic representation of a system in accordance with the present invention, wherein each of a plurality of bottles is disposed on support and weight determining apparatus in accordance with the present invention;

FIG. 2 is a side view of the support and weight determining apparatus shown in FIG. 1;

FIG. 3 is a plan view of the apparatus shown in FIG. 2;

FIG. 4 is a cross-sectional view of the apparatus shown in FIGS. 2 and 3;

FIG. 5 is a perspective view of the apparatus shown in FIGS. 2 to 4;

FIG. 6 is a perspective view of a weight sensing means in the form of a deflecting member employed in the apparatus of FIGS. 2 to 4;

FIG. 7 is a schematic view of the various components of the apparatus of the invention as shown in FIGS. 2 to 6;

FIG. 8 is a schematic view of a preferred apparatus in accordance with the present invention.

DETAILED DESCRIPTION OF THE FIGURES

Referring to the Figures wherein like numerals are employed for like components in the several views, FIG. 1 illustrates a typical set up of bottles of alcoholic beverages displayed on an apparatus in accordance with the present invention. As shown in FIG. 1, each of a plurality of bottles 10 are supported on support means or housings referred to generally by the numeral 12. The housings 12 are supported on a shelf, table, rack or other support surface generally designated by the numeral 14. The shelf 14 will, preferably, include a plurality of recessed portions 16, each recessed portion 16 being designed to receive a housing 12 in a manner such that the upper surface 18 of the housing 12 is flush with the upper surface 20 of the shelf 14. However, if desired, the housing 12 may rest directly on top of the shelf 14 so that it extends above the surface 20 of shelf 14. In this manner, the housings 12 may be employed in conjunction with substantially any existing shelf or other bottle support system.

Referring now to FIGS. 2 through 6, the housing 12 is shown as including an upper support surface 18, sides 22 and 24 and bottom surface 26. The upper support surface 18 preferably comprises a thin walled member which is at least slightly flexible or resilient so that when the bottle 10 including the contents thereof is placed on the upper support surface 18, the upper support surface 18 will give slightly or deflect downwardly. The undersurface 28 of the upper support surface 18 will preferably be electrically insulated to inhibit generation of undesired electrical signals. For example, the upper support surface 18 may comprise a resilient metal surface, the undersurface 28 of which includes an insulating layer of any conventional electrical insulation such as a layer of insulating plastic or tape.

Disposed within the housing 12 are weight sensing means, such as a deflecting member 30, as shown in FIGS. 4, 5 and 6. The deflecting member 30 is disposed so that an upper portion thereof designated by the numeral 32 directly contacts the undersurface 28 of the upper support surface 18. The deflecting member 30 preferably comprises a thin curved resilient member which can support its own weight and will be stressed or bowed by the upper support surface 18 when a bottle or other container is placed thereon. Insulation may also be provided on the deflecting member 30 so that its is electrically insulated from the undersurface 28 of the upper support surface 18.

The housing 12 will also include transducer means 40, amplifying means 42, and analogue-digital converter means 72 as shown in FIGS. 4, 5, 7 and 8.

The weight sensing means 30, which comprises a deflecting member as shown in FIGS. 4 through 7, is linked to or in contact with transducer means 40. The transducer means 40 is connected to the amplifying means 42 via leads 68 and 70 and the amplifying means is connected to the analogue-digital converter means via leads 74 and 76.

As seen in FIGS. 1, 7 and 8, the analogue-digital converter means is connected to computer means 80 disposed externally with respect to the housing 12.

In a preferred embodiment of the present invention, the transducer means 40 comprises a strain gauge resistor bridge or wheatstone bridge shown in FIG. 8, which bridge is generally indicated by the numeral 40a, and may comprise any conventional strain gauge arrangement as will be apparent to one skilled in the art. The strain gauge resistor bridge 40a is preferably housed in strain gauge housing 43 which is connected to the deflecting member 30 as shown in FIGS. 4 and 5 employing any conventional connecting or fastening means such as adhesive, or a nut and bolt arrangement. In the arrangement shown in FIG. 8, the strain gauge resistor bridge 40a comprises a strain gauge resistor 45 one end of which is connected to a first precision resistor 44 to form juncture 46, and the other end of which is connected to a second precision resistor 52 to form juncture 54. The first precision resistor 44 is also connected to a linking precision resistor 48 via juncture 50 and the second precision resistor 52 is also connected to the linking precision resistor 48 to form juncture 56.

The strain gauge resistor bridge 40a is connected to a regulated power supply 60 as shown in FIG. 8 by means of the lead wires 62 and 64 which are connected to junctures 46 and 56, respectively, of said bridge 40a. The power supply 60 is not shown in FIGS. 4 and 5 for purposes of drawing clarity.

The amplifying means 42 which preferably comprise a differential amplifier of conventional design is connected to the strain gauge resistor bridge 40a of FIG. 8 by leads 68 and 70 which are connected to junctures 54, 50 of the bridge 40a. Furthermore, differential amplifier 42 is connected via leads 74, 76 to an analogue-digital converter 72 of conventional design.

As will be seen hereinafter, initially, prior to the dispensing of a drink from the bottles 10, the power supply 60 and the three precision resistors 44, 48 and 52 as well as the strain gauge resistor 45 are adjusted so that all of the such resistors are in balance.

Upon removing a bottle 10 from the housing 12, and dispensing a drink therefrom and thereafter replacing the bottle 10 on the support surface 18 of housing 12, the forces originally acting on the deflecting member 30 will change thereby causing deflecting member 30 to bow or be strained which, in turn, will cause a variation in the strain gauge resistence of the strain gauge resistor 45.

A voltage will be produced across junctures 54 and 50 corresponding to the force applied to the deflecting member 30. The differential voltage generated across the bridge 40a is fed to the differential amplifier 42 to amplify such voltage to a level suitable for subsequent use as input to a computer, as will be described in detail below. The amplified voltage is fed to analogue-digital converter 72 wherein such voltage is converted to a digital signal which is fed to computer 88 via lead 78, which, if desired, may comprise a sequential pulse train.

It will be appreciated that the strain gauge resistor bridge 40a as well as differential amplifier 42 and the analogue-digital converter 72 all may be housed within the transducer housing 43 connected to the deflecting member 30. In such case, the strain gauge resistor bridge 40a, the differential amplifier 42 and the analogue-digital converter 72 may comprise an integrated circuit which is disposed on a single silicone chip. Alternatively, the strain gauge resistor bridge 40a, the differential amplifier 42 and the analogue-digital converter 72 may comprise discrete components which, as shown, in FIGS. 4, 5 and 7 are all housed within the housing 12.

The computer means 80, preferably comprises a central computer facility and includes request signal means for supplying at least first and second request signals to said analogue-digital converter 72 via lead 84 to activate said converter means to transmit said first and second electrical signals, in the form of amplified digital signals via lead 78 to said central computer facility. The leads 78 as shown in FIGS. 1, 7 and 8 may comprise telephone lines.

The central computer facility 80 also includes signal receiving and storing means for receiving and storing first and second electrical signals from said transducer means, signal comparison means for comparing at least first and second signals from said transducer means, and differential signal means for providing differential signals corresponding to the comparative weights of the material in any or all of said bottles and the amount of material dispensed from said bottles between first and second points in time.

It will be understood that the computer means 80 by itself does not comprise any of the embodiments of the present invention, but only forms one element of the apparatus and system of the invention. Any conventional computer means may be employed in the apparatus and system as well as in carrying out the method of the invention.

The apparatus, in accordance with the present invention, as described above, operates as follows:

Bottles of alcoholic beverage 10 are placed on the upper support surface 18 of the housing 12 as shown in FIG. 1. The weight sensing means 30, transducer means 40, amplifying means 42, analogue-digital convertor 72 and computer means 80 are connected up as shown in FIGS. 4 through 8. The regulated power supply 60 is regulated so that the resistors 45, 44, 48 and 52 are substantially in balance. A request signal is transmitted via lead 84 from the computer means 80 to said analogue-digital converter 72. The analogue-digital converter 72 is thereby activated and transmits a first digital signal to said computer means 80, said first digital signal corresponding to the weight of the bottle 10 and its contents. The first digital is received and stored in the computer means 80. When a bottle 10 is removed from the upper surface 18 and the housing 12 and alcoholic beverage is dispensed therefrom and the bottle is thereafter replaced on the upper support surface 18 of housing 12, the change in weight on the upper support surface 18 induces a change in force on the deflecting member 30. The change in force on the deflecting member 30 causes the deflecting member to bow or be stressed an amount corresponding to the change in weight of the bottle 10 and its contents, which in turn causes a change in the strain gauge resistance of the strain gauge resistor 45. The result is that a voltage is produced across the junctures 54 and 50 of the strain gauge resistor bridge 40a, which voltage corresponds to the strain gauge resistance of the strain gauge resistor 45. Assuming that the power supply 60 is adjusted to deliver 15 volts and assuming the voltage across the junctures 54 and 50 of the strain gauge resistor bridge 40a is 0.03 volt, the relatively small voltage is then fed into the differential amplifier 42 wherein it is converted to an amplified voltage of, for example, 5 volts analogue. In order to convert the amplified differential voltage to a form which can be employed as input to a computer, the amplified differential voltage is fed to the analogue-digital converter 72 wherein it is converted to a second corresponding digital signal. It will be understood by those skilled in the art that the format of the digital signals produced in the analogue-digital converter and fed to the computer 80 is not important.

The computer means transmits a second request signal to said analogue-digital converter 72 which in turn is activated to transmit said second digital signal to said computer means 80 wherein said digital signal is received and stored. The computer means 80 compares the first and second digital signals and provides a differential signal corresponding to the amount of material dispensed from the bottle 10.

It will be understood that each time a material is dispensed from any of the bottles 10, as shown in FIG. 1, an electrical signal, for example a voltage, which corresponds to the weight of the bottle and its contents, will be generated which voltage is amplified, converted to a digital signal which is transmitted to the computer means 80. The computer means 80 is adapted to receive and store each of such signals, compare the signals, and provide differential signals as described above. The computer means 80 will operate on such differential signals to determine the amount of material dispensed from any and all bottles, between first and second points in time, and will store such information until a printout is requested. The output of the computer means 80, in the form of a printout, may include the following information:

the incremental weight and/or incremental sales price of material dispensed from each bottle in any and all time intervals and/or the total weight and/or total sales price of material dispensed from each bottle;

the weight and/or sales dollar value of material in each bottle at an initial given time; and the balance of material in each bottle at a given point in time after said initial given time, said balance being indicated by weight or dollar value.

Where two or more bartenders are working simultaneously, each bartender will usually be dispensing drinks from a particular set of bottles. The computer means 80 can easily be programmed so that it prints out information relating to each set of bottles and the bartender responsible for each such set. In this manner, the proprietor will have access to information relating to the number of drinks dispensed, price per drink, and totals of drinks dispensed by weight and price for each bartender.

In a typical barroom or tavern, the type of alcoholic beverage contained in a particular bottle, for example Scotch whiskey, rye whiskey, vodka, gin and the like will vary in price. Accordingly, at an initial point in time, constants corresponding to the unit price for each type of alcoholic beverage will be fed into the computer means 80. Depending upon the signals received by the computer from a particular analogue-digital converter, the computer will multiply such signals by the appropriate constants (corresponding to the price of the particular alcoholic beverage) so that an accurate readout in dollar value of each type of alcoholic beverage dispensed may be obtained.

In another embodiment of the present invention different size strain gauge resistor bridges will be used corresponding to particular types of alcoholic beverage, so that the electrical signals produced will correspond to the weight and price of the alcoholic beverage dispensed.

It will also be appreciated that a clock or similar signal mechanism can be connected to the computer means 80 so that the computer will automatically produce printouts at any set time. For example, the computer means can automatically produce printouts at the end of the business day, any particular time during a business day, for example during or after peak hours, or immediately after conclusion of a shift of a particular bartender or during any specific time of such shift.

What is claimed is:

1. Apparatus for determining the amount of material dispensed from a container during at least first and second points in time, comprising, in combination:

container support means for supporting at least one container of material to be dispensed, said container support means comprising a housing including a container support surface which is at least partially flexible and is responsive to the weight of said container and the material therein, so that movement of said container support surface produced by said container and the material therein resting on said container support surface corresponds to the weight of said container and the material therein, transducer means mounted within said housing and responsive to movement of said container support surface for converting movement of said container support surface into a corresponding electrical signal, said electrical signal corresponding to the weight of said container and the material therein, and conversion means responsive to said transducer means for sampling the signals provided thereby at first and second points in time and converting said electrical signals into a useful format relating to the weight of material in said container during said first and second points in time and operating on said converted signals to determine the amount of material dispensed from said container between said first and second points in time.

2. The apparatus as defined in claim 1 further including a deflecting member for sensing weight of said container and the material therein, mounted within said housing in contact with at least a portion of said container support surface, so that movement of said container support surface causes corresponding movement of said deflecting member which corresponds to the weight of said container and the material therein, and said transducer means is mounted on said deflecting member for converting motion of said deflecting member into a corresponding electrical signal, said electrical signal corresponding to the weight of said container and the material therein.

3. The apparatus as defined in claim 1 further comprising amplifying means for amplifying said electrical signals before they are transmitted to said conversion means.

4. The apparatus as defined in claim 3 further comprising analogue-digital converter means, in operative communication with said amplifying means, for receiving said amplified electrical signal and converting the same to a corresponding digital signal to be fed to said conversion means.

5. The apparatus as defined in claim 1 wherein said transducer means comprises a strain gauge resistor bridge.

6. The apparatus as defined in claim 5 further comprising amplifying means, in operative communication with said strain gauge resistor bridge, for amplifying said electrical signal before it is fed to said conversion means, and analogue-digital converter means, in operative communication with said amplifying means, for receiving said amplified electrical signal and converting the same to a corresponding digital signal to be fed to said conversion means.

7. The apparatus as defined in claim 1 further comprising amplifying means disposed in said housing in operative communication with said transducer means.

8. The apparatus as defined in claim 7 further comprising analogue-digital converter means disposed in said housing and in operative communication with said amplifying means.

9. A system for determining the amount of alcoholic beverage dispensed from a plurality of individual bottles of alcoholic beverage, comprising in combination,
a plurality of bottle support means each of said bottle support means being adapted to support a bottle of alcoholic beverage in its normal upright position, each of said bottle support means comprising a housing including a bottle support surface which is at least partially flexible and is responsive to the weight of said bottle and the alcoholic beverage therein, a deflecting member for sensing weight of said bottle and the alcoholic beverage therein, mounted in said housing in contact with at least a portion of said bottle support surface, so that movement of said bottle support surface causes corresponding movement of said deflecting member which corresponds to the weight of said bottle and the alcoholic beverage therein, transducer means mounted on said deflecting member, for converting motion of said deflecting member into a corresponding electrical signal, said electrical signal corresponding to the weight of said bottle and the alcoholic beverage therein;
and conversion means in operative communication with and responsive to each of said transducer means for sampling the electrical signals provided thereby at first and second points in time and converting said electrical signals into a useful format indicating the comparative weight of alcoholic beverage dispensed from its respective bottle during said first and second points in time.

10. The system as defined in claim 9 further comprising separate and distinct amplifying means in operative communication with each of said transducer means and separate and distinct analogue-digital converter means in operative communication with each of said amplifying means, all of said analogue-digital converter means being in operative communication with said conversion means.

11. In a method for operating a system for determining the amount of material dispensed from a container during at least first and second points in time, said system including container support means for supporting at least one container of material to be dispensed, said container support means comprising a housing including a container support surface which is at least partially flexible and is responsive to the weight of said container and the material therein, so that movement of said container support surface produced by said container and the material therein resting on said container support surface corresponds to the weight of said container and the material therein, transducer means mounted in said housing and responsive to movement of said container support surface for converting movement of said container support surface into a corresponding electrical signal, said signal corresponding to the weight of said container and the material therein, and conversion means responsive to said transducer means for sampling the signal provided thereby at first and second points in time, and converting said electrical signals into a useful format relating to the weight of material in said container during said first and second points in time, and operating on said converted signals to determine the amount of material dispensed from said container between said first and second points in time, said method including the steps of supplying at least first and second request signals to said transducer means to activate said transducer means to transmit first and second electrical signals corresponding to the weight of said container and the material therein at first and second points in time, to said conversion means, transmitting said first and second electrical signals to and storing said signals in said conversion means, comparing said first and second electrical signals, and providing a differential signal corresponding to said first and second electrical signals and to the comparative weight of the material in said container during said first and second points in time.

12. The method in accordance with claim 11 further including the steps of transmitting first and second voltages from said transducer means to analogue-digital converter means, converting said first and second voltages to corresponding first and second digital signals, and transmitting said first and second digital signals to said conversion means.

* * * * *

UNITED STATES PATENT OFFICE
CERTIFICATE OF CORRECTION

Patent No. 3,863,724    Dated February 4, 1975

Inventor(s) NICHOLAS DALIA, JR.

It is certified that error appears in the above-identified patent and that said Letters Patent are hereby corrected as shown below:

Column 7, line 45, the numeral "88" should read --80--.

Signed and sealed this 22nd day of April 1975.

(SEAL)
Attest:

RUTH C. MASON
Attesting Officer

C. MARSHALL DANN
Commissioner of Patents
and Trademarks